United States Patent
Khan et al.

(10) Patent No.: US 11,313,940 B2
(45) Date of Patent: Apr. 26, 2022

(54) ADVERTISING AMBIENT PRESSURE INFORMATION

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 635 days.

(21) Appl. No.: 15/739,597

(22) PCT Filed: Jun. 29, 2015

(86) PCT No.: PCT/EP2015/064632
§ 371 (c)(1),
(2) Date: Dec. 22, 2017

(87) PCT Pub. No.: WO2017/000976
PCT Pub. Date: Jan. 5, 2017

(65) Prior Publication Data
US 2018/0180707 A1    Jun. 28, 2018

(51) Int. Cl.
*G01S 5/02* (2010.01)
*G01C 21/20* (2006.01)
(Continued)

(52) U.S. Cl.
CPC .............. *G01S 5/0263* (2013.01); *G01C 5/06* (2013.01); *G01C 21/206* (2013.01);
(Continued)

(58) Field of Classification Search
None
See application file for complete search history.

(56) References Cited

U.S. PATENT DOCUMENTS 8,612,172 B2    12/2013  Wirola et al.
9,841,284 B2 *  12/2017  Gemelli ............... H04W 76/10
(Continued)

FOREIGN PATENT DOCUMENTS

CN    107416623 A  * 12/2017
EP       2722683 A1     4/2014
(Continued)

OTHER PUBLICATIONS

International Search Report and Written Opinion of International Searching Authority for International Patent Application No. PCT/EP2015/064632 dated Mar. 21, 2016, 11 pages.
(Continued)

*Primary Examiner* — Eman A Alkafawi
*Assistant Examiner* — Leonard S Liang
(74) *Attorney, Agent, or Firm* — Alston & Bird LLP

(57) ABSTRACT

A method, performed by at least a first apparatus, is disclosed, comprising: automatically and repeatedly obtaining, at said first apparatus, information representative of an ambient pressure at said first apparatus; and automatically and repeatedly sending or triggering sending, by said first apparatus, at least a part of said obtained information representative of an ambient pressure at said first apparatus. A method, performed by at least a second apparatus, is disclosed, comprising: obtaining information representative of an ambient pressure at a first apparatus sent by said first apparatus and received at a device; and estimating an ambient pressure at said device at least based on said information representative of an ambient pressure at said first apparatus.

20 Claims, 6 Drawing Sheets

(51) Int. Cl.
*G01C 5/06* (2006.01)
*G01S 19/46* (2010.01)
*G01W 1/10* (2006.01)
*H04W 4/80* (2018.01)
*H04W 4/38* (2018.01)
*G01S 19/45* (2010.01)
*H04W 4/02* (2018.01)
*H04W 4/021* (2018.01)
*H04W 4/029* (2018.01)

(52) U.S. Cl.
CPC ............ *G01S 5/0236* (2013.01); *G01S 19/45* (2013.01); *G01S 19/46* (2013.01); *G01W 1/10* (2013.01); *H04W 4/38* (2018.02); *G01S 5/0252* (2013.01); *H04W 4/021* (2013.01); *H04W 4/023* (2013.01); *H04W 4/025* (2013.01); *H04W 4/029* (2018.02); *H04W 4/80* (2018.02)

(56) References Cited

U.S. PATENT DOCUMENTS

| | | | | |
|---|---|---|---|---|
| 9,854,404 | B2* | 12/2017 | Edge | H04W 4/025 |
| 9,911,290 | B1* | 3/2018 | Zalewski | G06Q 20/327 |
| 10,123,195 | B1* | 11/2018 | Bavand | G01C 21/206 |
| 10,145,689 | B1* | 12/2018 | Huberman | G01C 21/005 |
| 10,165,407 | B1* | 12/2018 | Hamidifar | H04L 67/22 |
| 10,165,543 | B1* | 12/2018 | Huberman | G01C 21/206 |
| 10,184,854 | B2* | 1/2019 | Tanabe | G01P 3/62 |
| 10,206,067 | B1* | 2/2019 | Gulo | G01S 5/0252 |
| 10,249,116 | B1* | 4/2019 | Nagpal | H04L 63/0876 |
| 10,349,377 | B1* | 7/2019 | Nagpal | G01R 33/02 |
| 2012/0072110 | A1* | 3/2012 | Venkatraman | G01S 5/0252 701/434 |
| 2012/0270566 | A1* | 10/2012 | Persson | G01C 5/06 455/456.3 |
| 2013/0099968 | A1 | 4/2013 | Katz | |
| 2013/0214909 | A1* | 8/2013 | Meijers | H04W 4/029 340/10.5 |
| 2013/0217332 | A1* | 8/2013 | Altman | H04W 12/04 455/41.2 |
| 2014/0039823 | A1* | 2/2014 | Raghupathy | G01S 5/021 702/94 |
| 2014/0114567 | A1* | 4/2014 | Buchanan | H04W 4/029 701/454 |
| 2014/0200846 | A1* | 7/2014 | Wachter | G01C 5/06 702/138 |
| 2014/0274151 | A1* | 9/2014 | Pattabiraman | H04W 16/18 455/456.3 |
| 2014/0323160 | A1* | 10/2014 | Venkatraman | G01C 5/06 455/456.6 |
| 2014/0324381 | A1* | 10/2014 | Venkatraman | G01S 5/0257 702/138 |
| 2014/0355461 | A1* | 12/2014 | Aldana | H04W 64/00 370/252 |
| 2014/0364101 | A1* | 12/2014 | Do | H04W 4/029 455/418 |
| 2015/0119071 | A1* | 4/2015 | Basha | H04W 64/00 455/456.1 |
| 2015/0133145 | A1 | 5/2015 | Palanki et al. | |
| 2015/0163634 | A1* | 6/2015 | Meredith | H04L 67/22 455/456.6 |
| 2015/0204649 | A1* | 7/2015 | McFarthing | G01S 19/48 702/150 |
| 2015/0373503 | A1* | 12/2015 | Jovicic | G01S 5/0252 455/456.1 |
| 2016/0021512 | A1* | 1/2016 | Krallman | H04W 4/33 455/456.3 |
| 2016/0044504 | A1* | 2/2016 | Edge | H04W 4/029 455/456.3 |
| 2016/0066151 | A1* | 3/2016 | Palanki | H04W 4/025 455/456.1 |
| 2016/0066157 | A1* | 3/2016 | Noorshams | H04W 4/38 455/457 |
| 2016/0142891 | A1* | 5/2016 | Virhia | G06Q 10/00 340/870.07 |
| 2016/0161592 | A1 | 6/2016 | Wirola et al. | |
| 2016/0274215 | A1* | 9/2016 | Edge | G01S 5/0273 |
| 2016/0316344 | A1* | 10/2016 | Harikae | G01C 21/206 |
| 2017/0041750 | A1* | 2/2017 | Jose | G01S 5/10 |
| 2017/0078851 | A1* | 3/2017 | Agrawal | H04W 4/021 |
| 2017/0223509 | A1* | 8/2017 | Han | G01W 1/06 |
| 2018/0038695 | A1* | 2/2018 | Bitra | G08G 5/0069 |
| 2018/0184287 | A1* | 6/2018 | Khan | H04L 9/0816 |
| 2018/0206078 | A1* | 7/2018 | Venkatraman | H04W 4/025 |
| 2018/0255434 | A1* | 9/2018 | Ivanov | G01C 21/206 |
| 2019/0011262 | A1* | 1/2019 | Khan | G09B 29/106 |
| 2020/0260406 | A1* | 8/2020 | Pattabiraman | H04W 64/003 |

FOREIGN PATENT DOCUMENTS

| | | | | |
|---|---|---|---|---|
| EP | 3264035 A1 * | 1/2018 | | H04W 4/35 |
| WO | WO-2012065184 A2 * | 5/2012 | | G01S 5/0257 |
| WO | WO-2014/068366 A1 | 5/2014 | | |

OTHER PUBLICATIONS

International Preliminary Report on Patentability (Chapter I) for International Patent Application No. PCT/EP2015/064632 dated Jan. 2, 2018, 8 pages.

Office Communication for European Application No. 15 732 658.8 dated Feb. 12, 2020, 5 pages.

"Specification of the Bluetooth System, Covered Core Package version: 4.2" Bluetooth SIG, Dec. 2, 2014, 12 pages.

* cited by examiner

ADVERTISING AMBIENT PRESSURE INFORMATION

FIELD OF THE DISCLOSURE

The invention relates to the field of utilizing ambient pressure measurements at a large number of mobile devices and in particular to utilizing ambient pressure measurements for different purposes such as positioning purposes.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth based positioning solutions, cellular network based positioning solutions and wireless local area network (WLAN) based positioning solutions.

As an example, a positioning solution based on WLAN (as an example of a communication network) may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths (RSS) and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

However, these indoor solutions require either deployment of totally new infrastructure (beacons, tags and so on) or manual exhaustive radio-surveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer mobile devices, such as smartphones.

SUMMARY OF SOME EMBODIMENTS OF THE INVENTION

For an indoor positioning solution to be commercially successful, firstly it should be globally scalable, secondly it should have low maintenance and deployment costs, and thirdly it should offer an acceptable end-user experience. Different aspects of the invention may therefore take into account an existing infrastructure in the buildings and/or existing capabilities in the consumer devices. Further, different aspects of the invention may enable the use of the existing infrastructures and device capabilities in such a way that makes it possible to not only achieve a precise (e.g. 2-3 m) horizontal positioning accuracy, but also a precise (e.g. close to a 100%) floor detection accuracy. Moreover, different aspects of the invention may at the same time allow for quickly building the global coverage for this approach.

According to a first exemplary aspect of the invention, a method, performed by at least a first apparatus, comprises automatically and repeatedly obtaining, by the first apparatus, information representative of an ambient pressure at the first apparatus; and automatically and repeatedly sending or triggering sending, by the first apparatus, at least a part of the obtained information representative of an ambient pressure at the first apparatus.

The information representative of an ambient pressure may for instance be or comprise an ambient pressure value. The information representative of an ambient pressure may for instance be a pressure measurement. The information representative of an ambient pressure may for instance be obtained or sent as an ambient pressure value in any suitable unit, such as Pascal (Pa), Bar (bar), Technical Atmosphere (at), Standard Atmosphere (atm), Torr (torr) or Pounds per square inch (psi), just to name a few examples. However, any proprietary units and scales may be used as well. Likewise, the information representative of an ambient pressure may for instance also comprise or be composed of information derivable from an ambient pressure or a measurement thereof. For instance, the information of an ambient pressure may be information converted or transformed from an ambient pressure into another quantity or value, which is still representative of the ambient pressure. Generally, the information representative of an ambient pressure may be based on a single pressure measurement, for instance. However, the information representative of an ambient pressure may also be based on at least two pressure measurements, for instance it may be based on an average of the at least two pressure measurements.

That the information is representative of an ambient pressure at the first apparatus may be understood to mean that the information is representative of an ambient pressure close to, in the proximity of, around or in the first apparatus, for example.

The information representative of an ambient pressure may be (triggered to be) sent by the first apparatus in a (radio) signal, for example. The information representative of an ambient pressure may for instance be obtained and/or sent as data, for example. In other words, the information representative of an ambient pressure may also be seen as data representative of an ambient pressure.

That the information representative of an ambient pressure is obtained automatically and repeatedly may be understood to mean, that the information representative of an ambient pressure may be obtained irregularly or regularly, for example after predefined intervals or periods of time and/or after a trigger event (e.g. a change (above a predefined threshold) of the ambient pressure), in particular without the necessity of any manual actions of a user. Likewise, that the information representative of an ambient pressure is (triggered to be) sent automatically and repeatedly may be understood to mean, that the information representative of an ambient pressure may be sent or triggered to be sent irregularly or regularly, for example after predefined intervals or periods of time (which may be the same or different intervals/periods of time with regard to the automatic and repeated obtaining) and/or after a trigger event (e.g. a change (above a predefined threshold) of the ambient pressure), in particular without the necessity of any manual actions of a user. As another example, the information representative of an ambient pressure may always (or only) be (triggered to be) sent in case the information representative of an ambient pressure is obtained. It As an example, the information representative of an ambient pressure at the first apparatus may be obtained after a period in the range of milliseconds, seconds, minutes, hours etc. Likewise and generally independently of the above period the information representative of an ambient pressure may be sent after a period in the range of milliseconds, seconds, minutes, hours etc. An advantageous period for (triggering) sending the information representative of an ambient pressure, however, may be from 20 milliseconds to 10 seconds, for instance. As an example, the intervals for (triggering) sending the information representative of an ambient pressure may be set to a default value. They may also comprise a random component in order enable mobile devices to easier detect signals from multiple first apparatuses in the neighborhood.

That at least a part of the obtained information representative of an ambient pressure at the first apparatus is (triggered to be) sent may be understood to mean that not all obtained information may be (triggered to be) sent by the first apparatus. For instance, the information representative of an ambient pressure may be obtained more often than they are (triggered to be) sent. However, it is also possible that the information representative of an ambient pressure are (triggered to be) sent more often than the information representative of an ambient pressure is obtained. In this case, the same information representative of an ambient pressure may be (triggered to be) sent more than once, for example until new information representative of an ambient pressure is obtained.

As an example, the method according to the first exemplary aspect of the invention may enable mobile devices receiving the information representative of an ambient pressure at the first apparatus (for example by receiving a signal from the first apparatus and extracting the information representative of an ambient pressure at the first apparatus) to further use the information representative of the ambient pressure at the first apparatus. Thus, the information representative of an ambient pressure at the first apparatus may be provided to a plurality of mobile devices (e.g. smartphones, tablets, laptops etc.), for example over a technology that is already supported by the mobile device and without the need of a measurement of an ambient pressure by the mobile device itself. This may have the effect, that information about an ambient pressure may be shared with a large audience. Also, this may have the effect, that the availability of pressure measurements to a large number of devices may be achieved, which facilitates application developers to use the pressure measurements.

The first apparatus may be a stationary device, for example. A stationary device is configured to be stationary when in operation and/or fixed to a particular location. A stationary device may be ground based and thus stationary with respect to Earth or only stationary within a particular environment, like a ship. Of course, the first apparatus may equally be a module, like a chip or circuitry on a chip, for a stationary device. Optionally, the first apparatus may comprise various other components, like a data interface, a user interface etc.

According to an exemplary embodiment of the method according to the first aspect of the invention, the first apparatus is at least a part of or comprises at least one of a Bluetooth beacon; a Bluetooth beacon enabling Bluetooth low energy mode; and a Bluetooth low energy beacon.

Such beacons can be easily installed in various locations and require little to no maintenance. For example, a plurality of beacons may be easily distributed over a certain area and may cover a certain area with signals sent by the beacons. However, Bluetooth beacons are often already installed in many buildings. Also, Bluetooth technologies are supported by many mobile user devices by default, like by most smartphones, tablets, laptops and feature phones. Using Bluetooth beacons and/or BLE beacons as first apparatuses may thus have the effect that the method may be based on an existing infrastructure in buildings and/or on existing capabilities in many mobile devices without any adaptation of hardware. As a result, the approach may be globally scalable and have low maintenance and deployment costs. The deployment of new infrastructure, including for example beacons and tags, is possible but not necessary. In addition, regarding positioning utilizing received signal strength (RSS) the end-user experience may be acceptable with these technologies, since a horizontal positioning accuracy of 2-3 meters as well as a high reliability in floor detection may be achieved. The beacons may be stand-alone devices or be integrated into or attached to some other device. For instance, the first apparatus may be a Bluetooth tag or token or a part thereof comprising such a beacon. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. It is to be understood, however, that other types of first devices than variations of Bluetooth beacons may be used as well, for instance tags or other devices that are configured to transmit ultra-wideband (UWB) signals or ultra-sound signals or any wireless signals that might emerge in the future.

According to an exemplary embodiment of the method according to the first aspect of the invention, the information representative of an ambient pressure at the first apparatus is sent in a broadcast and/or as advertising data and/or as advertising data in at least one air interface packet and/or using at least one advertising channel and/or and using at least one advertising channel that is provided for broadcasts. Each of these embodiments may have the effect that a mobile device that is to receive information representative of an ambient pressure does not have to be enabled to open a communication channel and that the reception of respective information may thus be accelerated and facilitated. This may further have the effect that the information that is transmitted in a single broadcast may be used by many mobile devices. This may save bandwidth as well as energy at the first apparatus and the mobile device. Advertising data is furthermore widely used for discovery of radio transmitters, which may enable a convenient adaptation of existing approaches for sending conventional advertising data for sending the information representative of an ambient pressure according to exemplary embodiments of the invention.

As an example embodiment for an implementation of sending the information representative of an ambient pressure as advertising data in a broadcast advertising channel, the first apparatus may comprise or be a Bluetooth (LE) beacon sending advertising data in a broadcast advertising channel. Generally, the advertising broadcast channel is provided to set up connections between two devices or to communicate broadcast information between unconnected devices.

The beacon advertising broadcast channel may be a set of three fixed physical channels. Each beacon packet that is transmitted over the air interface may have a defined packet format that is used on a link layer for both advertising channel packets and data channel packets. In further detail, the packet may comprise one or more of a preamble, e.g. of 1 octet (e.g. a byte with 8 bits), an access address, e.g. of 4 octets, a packet data unit (PDU), e.g. of 2 to 257 octets, and a cyclic redundancy check value (CRC), e.g. of 3 octets. The advertising channel packets may use a fixed value for the preamble and/or for the access address of the beacon packet. When a beacon packet is transmitted in an advertising physical channel, the PDU may be a specifically defined advertising channel PDU. The CRC may be calculated over the PDU.

The specifically defined advertising channel PDU may comprise a header, e.g. of 16 bits, and a payload. The header may comprise, among other fields, one or more of a field for indicating a PDU type, a TxAdd field and a length field for indicating the payload length in octets. The possible range of the payload length may be 6 to 37 octets. The payload may comprise an AdvA field, e.g. of 6 octets, for indicating a beacon's public or random device address, as indicated by the one bit TxAdd field in the header. As an example, the beacon's public device address in the form of a 6 octet MAC address may be used, and the bit of the TxAdd field may be set to "0". The 6 octet MAC address may function as BLE beacon ID. The payload may further comprise an AdvData field, e.g. of 0 to 31 octets. The AdvData field may receive advertising data of any type.

An example implementation is provided by the Specification of the Bluetooth® System Version 4.2 of Dec. 2, 2014 by the Bluetooth SIG. For further details, reference is made to this specification.

It is to be understood that any other packet format could be used just the same, for example though not exclusively a packet structure providing for an advertising data field of up to 255 octets, e.g. in line with future Bluetooth specifications, etc.

According to an exemplary embodiment of the method according to the first aspect of the invention, the method further comprises measuring, by the first apparatus, an ambient pressure for obtaining the information representative of an ambient pressure at the first apparatus. By measuring the ambient pressure by the first apparatus information representative of the ambient pressure at the first apparatus may be obtained in a simple manner. The ambient pressure may be measured as an absolute (static) pressure, as a gauge pressure or as a differential pressure, for instance. The measuring may be a direct or indirect measurement. For instance, the pressure can be measured by hydrostatic gauges. For instance, an electronic pressure sensor may be used, which may measure a pressure based on optical, magnetic, capacitive, piezoelectric or other effects.

According to an exemplary embodiment of the method according to the first aspect of the invention, the measuring of an ambient pressure is performed by at least one of: a pressure measurement instrument; a manometer; and a barometer. Each of these embodiments may have the effect that the pressure measurement can be employed easily at the first device in order to obtain the ambient pressure at the first device. For instance, the device performing the ambient pressure measurement may be integrated in the first apparatus. For instance, the pressure measurement instrument, the manometer or the barometer may be an integral part of the first apparatus. As an example, if the first apparatus is provided as a tag, e.g. a Bluetooth tag, with an integrated barometer, the tag may be seen as a "baro-tag", for example. Such a baro-tag can be easily deployed in buildings providing autonomous units measuring and sending information representative of an ambient pressure.

According to an exemplary embodiment of the method according to the first aspect of the invention, the information representative of an ambient pressure is representative of an atmospheric pressure at a location of the first apparatus. Atmospheric pressure is understood to be the pressure exerted by the weight of air in the atmosphere of Earth. In most circumstances the atmospheric pressure is closely approximated by the hydrostatic pressure caused by the weight of air above the measurement point. In some circumstances, e.g. outdoors, the atmospheric pressure is equal to the ambient pressure. However, in some situations, e.g. indoors, the ambient pressure may deviate from the atmospheric pressure due to artificially created low or high ambient pressures. In case the information representative of an ambient pressure is representative of an atmospheric pressure at a location of the first apparatus, this information as an example of use can be applied for weather predictions or the like.

According to an exemplary embodiment of the method according to the first aspect of the invention, the method further comprises sending or triggering sending, by the first apparatus, further information, wherein the information representative of an ambient pressure and the further information are sent in a common data packet or in separate data packets. Each of these embodiments may have the technical effect that the first apparatus can be used to also send further information, e.g. further advertising data. As an example, the first apparatus may send location specific advertising data, e.g. positioning data, data related to a retail store (e.g. its offers) or the like. In one example, the further information may comprise information about a (relative or absolute) vertical position of the first apparatus, e.g. an altitude above sea level of the first apparatus or floor level of the first apparatus. The information about the vertical position in combination with the information representative of an ambient pressure at the first apparatus may enable devices receiving the information to determine the vertical position of the device not only relatively with respect to the first apparatus, but also with respect to another relative or absolute reference level, such as sea level or ground level. As an example, the absolute or relative height of the first apparatus may be stored in the first apparatus, when it is installed.

Generally, the information representative of an ambient pressure will not take up the complete payload of a data packet (even though it may be also possible to spread the information representative of an ambient pressure over more than one data packet). Thus, the information representative of an ambient pressure may be combined with further information, e.g. further data, in the payload of a data packet. Thus, in order to send the information representative of an ambient pressure there would be no need of reserving a complete data packet (e.g. an advertising data packet) just for sending the information representative of an ambient pressure. Rather, the information representative of an ambient pressure could be integrated into data packets with further information which may be sent anyway. However, it may alternatively be advantageous to send the further information and the information representative of an ambient pressure in separate data packets. In other words, the information representative of an ambient pressure may be sent in dedicated data packets. For instance, the data packets comprising the information representative of an ambient pressure and the data packets comprising the further information may be sent in an alternating or interleaving manner, to provide an example.

According to a second exemplary aspect of the invention, a method, performed by at least a second apparatus, comprises: obtaining information representative of an ambient pressure at a first apparatus sent by the first apparatus and received at a device; and estimating an ambient pressure at the device at least based on the information representative of an ambient pressure at the first apparatus.

The device receiving the information representative of an ambient pressure may in particular be the second apparatus or different from the second apparatus. The device may in particular be a mobile device (or a part thereof), such as a mobile phone or the like, or a stationary device (or a part thereof), such as a server.

Likewise, the second apparatus may for instance be a mobile device (or a part thereof), such as a mobile phone or a stationary device, such as a server (or a part thereof), as will also be described in further detail below. As explained, the second apparatus may in particular be the device which has received the information representative of an ambient pressure sent by the first apparatus. The information representative of an ambient pressure may for instance be obtained at the device receiving a signal from the first apparatus. The information representative of an ambient pressure may also be obtained at a server, after they have been received at the device and sent from the device (e.g. over the internet) to the server. Certain embodiments of the exemplary method according to the second exemplary aspect of the invention may also be performed by more than one second apparatus, e.g. a system of a mobile phone and a server.

The first apparatus may in particular be a first apparatus performing exemplary embodiments of the method according to the first aspect of the invention.

The estimating of an ambient pressure at the device is at least (or solely) based on the information representative of an ambient pressure at the first apparatus. If the signals of first apparatus comprising the information representative of an ambient pressure at the first apparatus are receivable only in a limited range or distance, e.g. for 100 meters or less from the first apparatus, the ambient pressure at the first apparatus is a good approximation of the ambient pressure at the device. Thus, the information of an ambient pressure at the first apparatus may directly be used for the estimation of an ambient pressure at the device. For instance, it may be estimated that the ambient pressure at the first apparatus equals the ambient pressure at the device. In an example, no further information may thus be needed for the estimation of an ambient pressure at the device. However, the estimation of an ambient pressure at the device may also be based on further information. As an example, the estimation of an ambient pressure may be based on further obtained information representative of an ambient pressure at further first apparatus received at the device.

According to an exemplary embodiment of the method according to the second aspect of the invention, the method further comprises: receiving, by the device, a signal, sent by the first apparatus, comprising the information representative of an ambient pressure at the first apparatus; and extracting, from the signal, the information representative of an ambient pressure at the first apparatus.

For instance, the receiving of the signal at the device may be performed via a wireless communication interface of the device. The signal may be a radio signal, for instance. The signal may comprise the information representative of an ambient pressure at the first apparatus and optionally further information. The extracting of the information representative of an ambient pressure at the first apparatus from the signal may be realized by reading the PDU of a data packet and saving the information representative of an ambient pressure at the first apparatus, for example. The extracting may also comprise a decoding, decrypting, interpreting and/or decompressing of the information representative of an ambient pressure, if necessary. The receiving may be performed by the device itself (or a part thereof) having received the signal. The extracting may also be performed by the device itself (or a part thereof). However, the extracting may also be performed by a server (or a part thereof), as an example.

According to an exemplary embodiment of the method according to the second aspect of the invention, the method further comprises: performing the obtaining of information representative of an ambient pressure at the first apparatus for at least two first apparatuses, such that information representative of respective ambient pressures at respective first apparatuses sent by the respective first apparatuses and received at the device is obtained; and weighting the information representative of respective ambient pressures at the respective first apparatuses to estimate the ambient pressure at the device.

Multiple (i.e. at least two) first apparatuses, which may each perform exemplary embodiments of the method according to the first aspect of the invention, may be deployed in an area. Thus, the device may receive signals from multiple first apparatuses. For instance, the device may observe the signals of different first apparatuses at the device from a single position or limited area, for instance simultaneously or within a limited interval. The information of an ambient pressure at different first apparatuses allows for weighting this information for estimating an ambient pressure at the device. This may lead to more precise estimations of an ambient pressure at the device. For instance, if information representative of a distance of the device from each first apparatus is available, the information representative of the respective ambient pressures may be weighted accordingly. For instance, the closer the device is to a first apparatus, the more weight the information on an ambient pressure at the respective first device will get. As an example, an estimation of the distance from the device to a respective first apparatus may be based on the received signal strength (RSS) of the signals sent by the respective first apparatus and received at the device. In other words, the measurements of an ambient pressure at the respective first apparatuses may be weighted with RSS values of the respective first apparatuses. It is also possible, that absolute information on the position of the respective first apparatuses and the device may be available, from which information on a distance may be derived. However, it is also possible that information of an ambient pressure at the respective first apparatuses may be weighted equally. This may in particular be done in absence of any information representative of a distance of the device from respective first apparatuses. The obtaining and weighting may be performed by the device itself (or a part thereof) or by a server (or a part thereof).

According to an exemplary embodiment of the method according to the second aspect of invention, the method further comprises receiving, at the device, signals sent by at the least two first apparatuses; and extracting from the signals the information representative of respective ambient pressures at the respective first apparatuses.

As already explained, the receiving of the (radio) signals at the device may be performed via a wireless communication interface of the device. Each signal may comprise respective information representative of an ambient pressure at the respective first apparatus and optionally further information. The respective extracting may in particular comprise the actions and be performed by the apparatuses already disclosed above with respect to one first apparatus.

According to an exemplary embodiment of the method according to the second aspect of the invention, the device is or comprises at least one of a Bluetooth receiver; a Bluetooth receiver enabling Bluetooth low energy mode; and a Bluetooth low energy receiver. Each of the embodiments can be used to receive at the device signals comprising information representative of an ambient pressure at the respective first device, which sent the signal. Many devices (such as mobile phones, laptops, smartwatches etc.) already comprise Bluetooth (LE) receivers. Thus, each of the above embodiments may have the effect, that embodiments of the method according to the first and second exemplary aspects can be employed without any further hardware updates on the device side. In addition, such technologies for receiving the information representative of an ambient pressure at the device allows for low power consumption on the device side. As an example, the device may comprise a Bluetooth (LE) component, which includes at least a Bluetooth (LE) receiver. The Bluetooth (LE) receiver may also be a part of a Bluetooth (LE) transceiver. The Bluetooth (LE) component may be configured to scan for radio signals that are broadcast by Bluetooth (LE) beacons, to extract information representative of an ambient pressure (e.g. from advertising data) contained in detected Bluetooth (LE) signals.

According to an exemplary embodiment of the method according to the second aspect of the invention, the information representative of an ambient pressure is received via a broadcast and/or advertising data and/or advertising data in at least one air interface packet and/or at least one advertising channel and/or at least one advertising channel that is provided for broadcasts. As already explained with respect to the first exemplary aspect, each of these embodiments may have the effect that a device that is to receive information representative of an ambient pressure does not have to be enabled to open a communication channel and that the reception of respective information may thus be accelerated and facilitated. Again, this may further have the effect that the information that is transmitted in a single broadcast may be used by many devices.

According to an exemplary embodiment of the method according to the second aspect of the invention, the device comprises or lacks an ambient pressure measurement instrument.

In case the device lacks a pressure measurement instrument, exemplary embodiments of the second aspect of the invention allow estimating an ambient pressure at the device even though the device itself lacks an ambient pressure measurement instrument. For instance, the device itself or a server may be able to estimate the ambient pressure at the device without requiring the device to comprise a pressure measurement instrument. As an example, barometer capabilities may be enabled in various devices able to receive the signals comprising information representative of an ambient pressure at the first apparatus.

In case the device comprises an ambient pressure measurement instrument, exemplary embodiments of the second aspect of the invention allow estimating an ambient pressure at the device independently from the pressure measurement instrument of the device. This may allow, as an example, for calibrating the ambient pressure instrument of the device. As an example, the exemplary embodiments of the method according to the second aspect may thus comprise calibrating a pressure measurement instrument of the device at least based on the estimated ambient pressure at the device, which estimation is at least based on the information representative of an ambient pressure at the first apparatus. However, in certain scenarios further information may be required or useful for such a calibration. For example, prior information about the altitude or height of the first apparatus (i.e. the altitude or height of measurement of the ambient pressure at the first apparatus) and/or information about the distance from the first apparatus (which information may be provided by the received signal strength (RSS) of the signal sent by the first apparatus) may be required or used as well.

According to an exemplary embodiment of the method according to the second aspect of the invention, the method furthers comprises determining at least one of a state of the device and a change of a state of the device at least based on the estimated ambient pressure at the device. The state or the change of state of the device may be determined by the device itself (or a part thereof) or by a server (or a part thereof), for instance. The (change of a) state may relate to a (change of a) physical state of the device, such as a position, for instance to a (change of a) horizontal and/or vertical position of the device.

In this regard, according to an exemplary embodiment of the method according to the second aspect of the invention, the state is or relates to at least one of: a vertical position of the device; and an indoor/outdoor state of the device.

A vertical position of the device may for instance be an (absolute or relative) altitude, height or elevation of the device, e.g. an altitude, height or elevation above sea level or an altitude, height or elevation above ground or any other suitable reference level. For instance, if the sea level (atmospheric) ambient pressure in the area or at the location of the device is known, the altitude above sea level may be determined by comparing the known (atmospheric) ambient pressure at sea level with the estimated (atmospheric) ambient pressure at the device. In another example, the device may also determine a relative altitude of the device with respect to the first apparatus, based on the difference in ambient pressure at the device and the first apparatus, for example. In yet another example, the device may also receive (e.g. from the first apparatus) information about an (absolute or relative) vertical position (e.g. altitude, height, floor level) of the first apparatus. As an example, the device may receive information about the absolute altitude (e.g. above sea level) or relative altitude (e.g. from the ground floor) of the first apparatus. This may then allow for a determination of the (absolute or relative) altitude of the device based on the (absolute or relative) altitude of the first apparatus and the difference in ambient pressure between the first apparatus and the device. The difference in the (atmospheric) ambient pressure may be converted in the altitude of the device above sea level. As examples, the altitude may be measured in units of length (such as meter, kilometer, feet, etc). As another example, the vertical position may also be or represent the floor level, for instance "ground floor", "first floor", "second floor", etc. For this, the floor height may need to be estimated or known.

As another example, a (first) estimated ambient pressure at the device at a first time instance may be compared with a (second) estimated ambient pressure at the device at a second time instance. It may be assumed, that the atmospheric ambient pressure is stable for short temporal intervals (for example in the range of minutes, such as 10 minutes, for instance). The difference in the first and second estimated pressure at the device may then be converted in a change of the vertical position (i.e. a change of the altitude, height, elevation, floor level etc.) of the device between the first and second time instance.

The indoor/outdoor state of the device may for instance indicate if the device (and thus the user of the device) is indoors or outdoors. For instance, a building may be kept at an ambient pressure different from (e.g. higher or lower than) the ambient pressure outside. Thus the estimated ambient pressure at the device may indicate an indoor or outdoor state of the device. As explained before, if an ambient pressure at the device at a first time instance is compared with an estimated ambient pressure at the device at a second time instance, a change of the indoor/outdoor state may be determined, as it may be assumed, that the atmospheric ambient pressure is stable for short temporal intervals. The determined information about the indoor/outdoor state of the device may, as an example, be used for deciding which positioning technology to use for a positioning of the device. For instance, if it is determined that the device is outdoors, a satellite based positioning technology may be preferred. For instance, if it is determined that the device is indoors, a positioning based on ultra-sound, Bluetooth based, cellular network or wireless local area network (WLAN) based positioning solutions may be preferred.

According to an exemplary embodiment of the method according to the second aspect of the invention, the method further comprises obtaining position information representative of a position of the device; and estimating a position of the device at least based on at least one of the obtained position information and the estimation of the ambient pressure at the device.

An obtaining of position information may comprise obtaining a relative or absolute position of the device. For instance, the position information may at least comprise information representative of a two- or three-dimensional position of the device (e.g. on the surface of the earth). The position information may be obtained via (radio) signals for example. In particular, the position information may be obtained at the device via a radio signal of the first apparatus also sending the information representative of the ambient pressure at the first apparatus.

The estimating of a position of the device may be based on the obtained position information alone, as an example. This will allow for associating an estimated ambient pressure at the device with an estimated position of the device. However, the estimated position of the device may also be seen as an estimated position of the first apparatus (triggering) sending the information representative of an ambient pressure. In any case, the estimated ambient pressure associated with position information may be used for crowed sourcing location specific ambient pressure information, as an example.

The estimating of a position of the device may also be based on both the obtained position information and the estimation of the ambient pressure at the device. For instance, as described before, the estimation of an ambient pressure at the device may be used to determine a vertical position of the device. Thus, the estimation of the ambient pressure at the device may help or support the estimating e.g. the altitude or the floor level of the device, as this information may not or not sufficiently be determinable from the position information.

According to an exemplary embodiment, of the method according to the second aspect of the invention, the obtained position information at least is based on or comprises at least one of: a received signal strength; a timing measurement; an angle of arrival; a timing measurement; a magnetic field strength and/or direction; and an identification of a transmitter.

For instance, in the case of measurements on cellular signals, the position information may contain their (emitted/received) signal strengths and/or path losses and/or timing measurements like propagation delay, timing advance (TA) or round-trip time (RTT). Further, the position information may alternatively or additionally contain an angle of arrival (AOA) of the signal and/or magnetic field strength and/or a magnetic field direction of the signal. Alternatively or additionally, the position information may contain a global and/or local identification of the cellular transmitters or cells observed. Non-limiting examples of an identification are cellular cell identifiers (e.g. a Mobile Country Code (MCC), a Mobile Network Code (MNC), a Local Area Code (LAC) and/or a Cell Identity (CID) in the case of coverage areas of a 2G mobile communications system, a UTRAN Cell ID (UC-ID) in the case of a 3G mobile communications system, or an LTE Cell Identity in the case of a 4G communications system).

For measurements on Bluetooth network signals or wireless local area network (WLAN) signals, as an example of signals of a non-cellular system, the position information may contain the signal strength of received signals (received signal strength indication RSSI or physical Rx level in dBm with a reference value of 1 mW, for example). The measurements may alternatively or additionally contain a basic service set identification (BSSID), like the medium access control (MAC) address of observed access points (APs), the service set identifier (SSID) of the access points.

According to an exemplary embodiment of the method according to the second aspect of the invention, the obtained position information is derived from at least one of: a Global Navigation Satellite System (GNSS); a Wireless Local Area Network (WLAN) system; a Bluetooth (BT) system; a Radio Frequency Identification (RFID) system; a cellular network system; one or more sensors; and a manual input. For instance, the first apparatus may be part of the system, which the position information is derived from. As an example, the first apparatus may be a Bluetooth (LE) beacon and the position information may be derived from this Bluetooth system, e.g. the received signal strength (RSS) of the Bluetooth (LE) signal. The sensor may for instance be an accelerometer, a gyroscope, a magnetometer, a barometer or any other sensor suitable for deriving position information. A manual input may be performed by the user (e.g. of the device).

According to an exemplary embodiment of the method according to the second aspect of the invention, the method further comprises: performing the estimating of an ambient pressure at the device and the estimating of a position of the device for a plurality of devices; collecting respective estimations of respective ambient pressures at the respective devices; and collecting the respective estimations of respective positions of the respective devices associated with the respective estimations of respective ambient pressures at the respective devices. Since estimating an ambient pressure at the device can be based on the information representative of an ambient pressure at the first apparatus, a plurality of devices (even if lacking an ambient pressure instrument) can be used for collecting estimations of ambient pressures and associated positions. As an example, the estimations of ambient pressures and associated positions may be obtained by a server (e.g. transmitted from respective devices to the server) and stored in a database of the server. This approach can be seen as crowd-sourcing. For example, crowd sourcing of reference pressures can be performed on a large scale. The approach can be realized, as the capability of determining the ambient pressures may be effectively enabled in many devices according to embodiments of different aspects of the invention.

According to an exemplary embodiment of the method according to the second aspect of the invention, the method further comprises: determining information representative of a floor height of a building at least based on the respective estimations of respective ambient pressures at respective devices. As an example the information representative of a floor height of a building may be the floor height e.g. in a unit of length, e.g. meters, feet etc. For example, a difference between estimations of respective ambient pressures may be converted into information representative of a floor height of a building. For instance, vertical positions of the respective devices at least based on the collected estimations of respective ambient pressures at the respective devices may be determined. Differences in vertical positions may then be used for determining the floor height of a building.

According to an exemplary embodiment of the method according to the second aspect of the invention, the method further comprises: collecting information representative of times of measurement of the respective estimations of the respective ambient pressures at the respective devices. As an example, the information representative of times of measurement may be obtained at a server (e.g. transmitted from respective devices to the server) and stored in a database of a server.

According to an exemplary embodiment of the method according to the second aspect of the invention, the method further comprises: determining information related to a weather prediction at least based on one or more of: the collected estimations of respective ambient pressures at the respective devices; the collected estimations of respective positions of the respective devices; and the collected information representative of respective times of measurement of the respective estimations of respective ambient pressures at the respective devices. However, determining information related to a weather prediction based on this information may only be one example of an application which uses this information. Other exemplary applications are possible as well.

According to an exemplary embodiment of the method according to the second aspect of the invention, the second apparatus is at least one of a server or a part thereof; and a mobile device or a part thereof. The actions (or only a part thereof) of the method according to example embodiments of the second aspect may be performed by a server. The actions (or only a part thereof) of the method according to example embodiments of the second aspect may be performed by a mobile device. The mobile device may in particular be the mobile device receiving the information representative of an ambient pressure. Exemplary embodiments of the second apparatus will be described with respect to the exemplary embodiments of the further aspects of the invention.

According to a third exemplary aspect of the invention, a computer program code is described, the computer program code when executed by a processor causing an apparatus to perform the actions of the method according to the first and/or second aspect (and/or any of its embodiments described herein).

According to a fourth exemplary aspect of the invention, a (e.g. non-transitory and/or tangible) computer readable storage medium is described in which computer program code according to the second aspect (and/or any of its embodiments described herein) is stored. The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a fifth exemplary aspect of the invention, an apparatus configured to realize or comprising respective means for realizing the method according to the first and/or second aspect of the invention (and/or any of its embodiments described herein). The means of these apparatuses can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

According to a sixth exemplary aspect of the invention, an apparatus comprising at least one processor and at least one memory including computer program code, the at least one memory and the computer program code configured to, with the at least one processor, cause an apparatus at least to perform the method according to the first and/or second aspect of the invention (and/or any of its embodiments described herein).

Any of the described apparatuses may comprise only the indicated components or one or more additional components. Any of the described apparatuses may be a module or a component for a device, for example a chip. Alternatively, any of the described apparatuses may be a device, for instance a server or a mobile device. Any of the described apparatuses may for instance at least comprise a user interface, a communication interface and/or an antenna.

In particular, any of the apparatuses may be one of a beacon or a part thereof (e.g. the first apparatus); a server or a part thereof (e.g. the second apparatus); and a mobile device or a part thereof (e.g. the second apparatus). As an example, the beacon may be any of a Bluetooth beacon; a Bluetooth beacon enabling Bluetooth low energy mode; and a Bluetooth low energy beacon.

According to a seventh exemplary aspect of the invention, a system is described, comprising two or more apparatuses, together configured to realize or comprising respective means for realizing the method according to the first and/or second aspect of the invention (and/or any of its embodiments described herein).

According to an eighth exemplary aspect of the invention, a system is described comprising two or more apparatuses, each apparatus comprising at least one processor and at least one memory including computer program code, the respective at least one memory and the respective computer program code configured to, with the respective at least one processor, cause the apparatuses at least to perform together the method according to the first and/or second aspect of the invention (and/or any of its embodiments described herein).

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1 is a schematic illustration of beacons 1-1, 1-2, 1-3 sending obtained information representative of an ambient pressure and an exemplary embodiment of a mobile device 2 receiving the information representative of an ambient pressure sent by the beacons 1-1, 1-2, 1-3. The beacons 1-1, 1-2, 1-3 may each be an exemplary embodiment of an apparatus (e.g. a first apparatus) performing an exemplary embodiment of a method according to the first aspect of the invention. The beacons 1-1, 1-2, 1-3 may be evenly distributed at a certain site. The mobile device 2 may be an exemplary embodiment of an apparatus (e.g. a second apparatus) performing an exemplary embodiment of a method according to the second aspect of the invention (or parts thereof). Further, FIG. 1 illustrates a server 3, which can communicate with mobile device 2. The server 3 may also be an exemplary embodiment of an apparatus (e.g. a second apparatus) performing an exemplary embodiment of a method according to the second aspect of the invention (or parts thereof). In particular, in case the server is a local server 3 in the area 4 of the beacons 1-1, 1-2, 1-3, the server 3 may also (directly) receive signals from beacons 1-1, 1-2, 1-3 or communicate with beacons 1-1, 1-2, 1-3. This is illustrated by the dashed arrows in FIG. 1. As an example, the server 3 may obtain information representative of an ambient pressure at the beacons 1-1, 1-2, 1-3 (e.g. as advertisement data from the beacons 1-1, 1-2, 1-3). Alternatively or additionally, the server 3 may also sent information to the beacons 1-1, 1-2, 1-3, such as configuration data, e.g. height information of the respective beacon just to name an example. In the illustrated example of FIG. 1, the server could communicate with the beacons 1-1, 1-2, 1-3 over mobile device 2. However, it is also possible that server 3 is located in the coverage area of the beacons 1-1, 1-2, 1-3 and may thus communicate with the beacons 1-1, 1-2, 1-3 directly. The components form a system 4, which may be an exemplary embodiment of a system according to the invention.

The components of the mobile device 2 are described in more detail with respect to FIG. 3. In FIG. 1, mobile device 2 is configured to receive signals from the beacons 1-1, 1-2, 1-3, as the beacons 1-1, 1-2, 1-3 provide radio coverage in the area of the mobile device 2. However, at different positions within the coverage area of the respective beacon 1-1, 1-2, 1-3, the mobile device 2 will measure different received signal strengths (RSS). This may allow the mobile device 2 to obtain positioning information representative of the position of the mobile device and estimate its position. As already described, non-limiting examples of a beacon may be a Bluetooth beacon, a Bluetooth beacon enabling Bluetooth low energy mode, and a Bluetooth low energy beacon. Of course, the mobile device may also receive signals of further transmitter such as cells, nodes or base stations (or sectors thereof) of a cellular communication system, such as for instance a 2G, 3G, 4G or 5G communication system, or a node (e.g. an access point AP or base station BS) of a non-cellular communication system, such as for instance a WLAN network.

The mobile terminal 2 may also be configured to determine position information based on a Global Navigation Satellite System (GNSS), for example (not shown). However, in particular for indoor situations, there may be no reception of GNSS signals or the GNSS signals may be too weak in order to get reliable location information.

Figure 1:
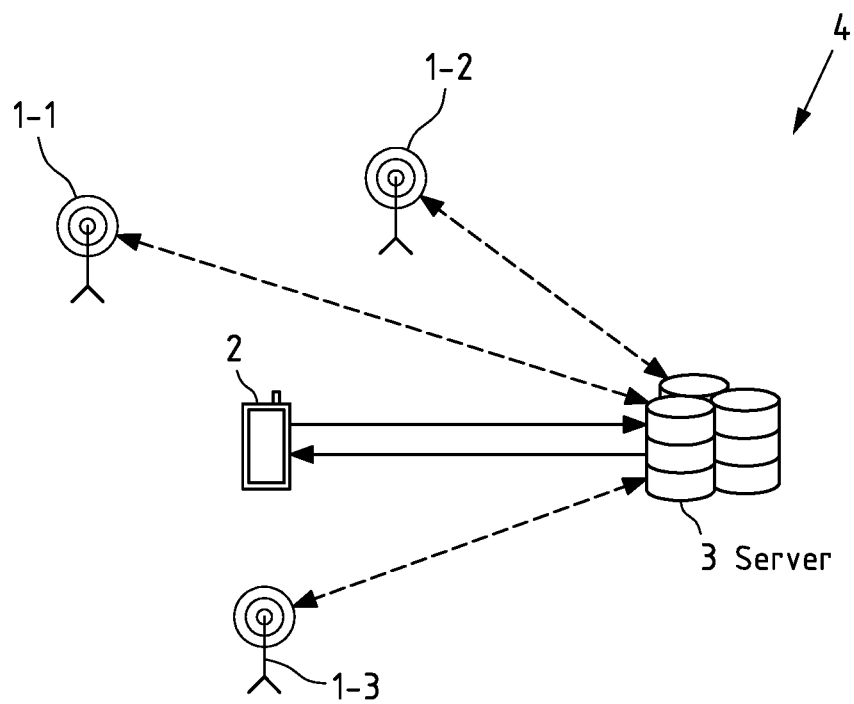
FIG. 1 is a schematic illustration of beacons sending obtained information representative of an ambient pressure, a mobile device receiving the information representative of an ambient pressure sent by the beacons, and a server.
Figure 2:
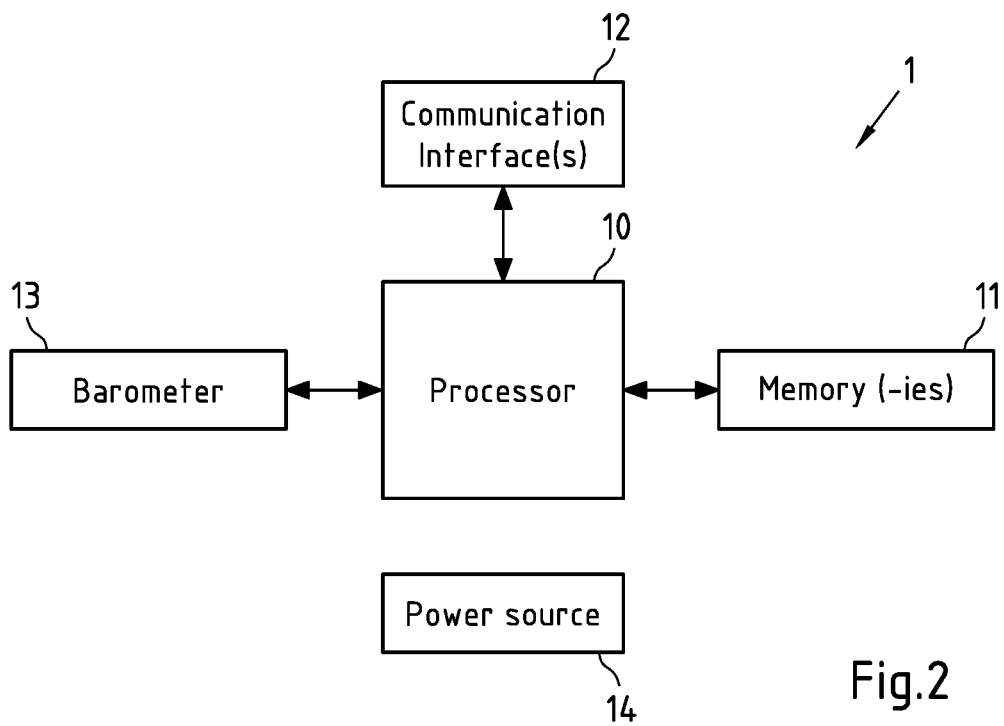
FIG. 2 is a block diagram of a beacon of FIG. 1.

FIG. 2 is an exemplary block diagram of a beacon 1 representative for any of the beacons 1-1, 1-2, 1-3 of FIG. 1. Beacon 1 comprises a processor 10. Processor 10 may represent a single processor or two or more processors, which are for instance at least partially coupled, for instance via a bus. Processor 10 executes a program code stored in memory 11 (for instance program code causing beacon 1 to perform one or more of the embodiments of a method according to the first aspect of the invention (as for instance further described below with reference to FIG. 5), when executed on processor 10). Some or all of memory 11 may also be included into processor 10. For instance, one of or all of memory 11 may be fixedly connected to processor 10 or at least partially removable from processor 10, for instance in the form of a memory card or stick. Memory 11 may for instance be a volatile or non-volatile memory. It may for instance be a RAM or DRAM memory. It may for instance be a FLASH memory (or a part thereof), any of a ROM, PROM, EPROM and EEPROM memory (or a part thereof) or a hard disc (or a part thereof), to name but a few examples. It may for instance be used as a working memory for processor 20 when executing an operating system and/or programs. Memory 11 may also comprise an operating system for processor 10. Memory 11 may for instance comprise a first memory portion that is fixedly installed in beacon 1, and a second memory portion that is removable from beacon 1, for instance in the form of a removable SD memory card.

Processor 10 further controls a communication interface 12 configured to receive and/or output information. For instance, communication interface 12 may at least comprise a BLE component including a BLE transmitter (TX). The communication interface 12 may additionally comprise a BLE receiver (RX). The transmitter and receiver may also be part of a BLE transceiver (TRX). The BLE transmitter enables beacon 1 to transmit signals in line with any current or future version of the Bluetooth standard supporting a low energy mode.

It is to be understood that beacon 1 may comprise various other components. While only a single beacon 1 is depicted in FIG. 2, it is to be understood that the further beacons may have the same or similar structure as beacon 1.

Processor 10 further controls a barometer 13 as an example for a pressure measurement instrument. The barometer 13 measures the ambient pressure at (or close to) the location of beacon 1. Thus, beacon 1 can automatically and repeatedly obtain information representative of an ambient pressure (e.g. a pressure value) at the beacon 1. The beacon 1 can then automatically and repeatedly send the obtained information representative of an ambient pressure over the BLE transmitter of the communication interface 12.

In this embodiment, beacon 1 also comprises a power source 14, which may for instance be a battery. Additionally or alternatively, it is also possible that beacon 1 is powered by an external power source. As an example, the beacon may be AC powered.

Figure 3:
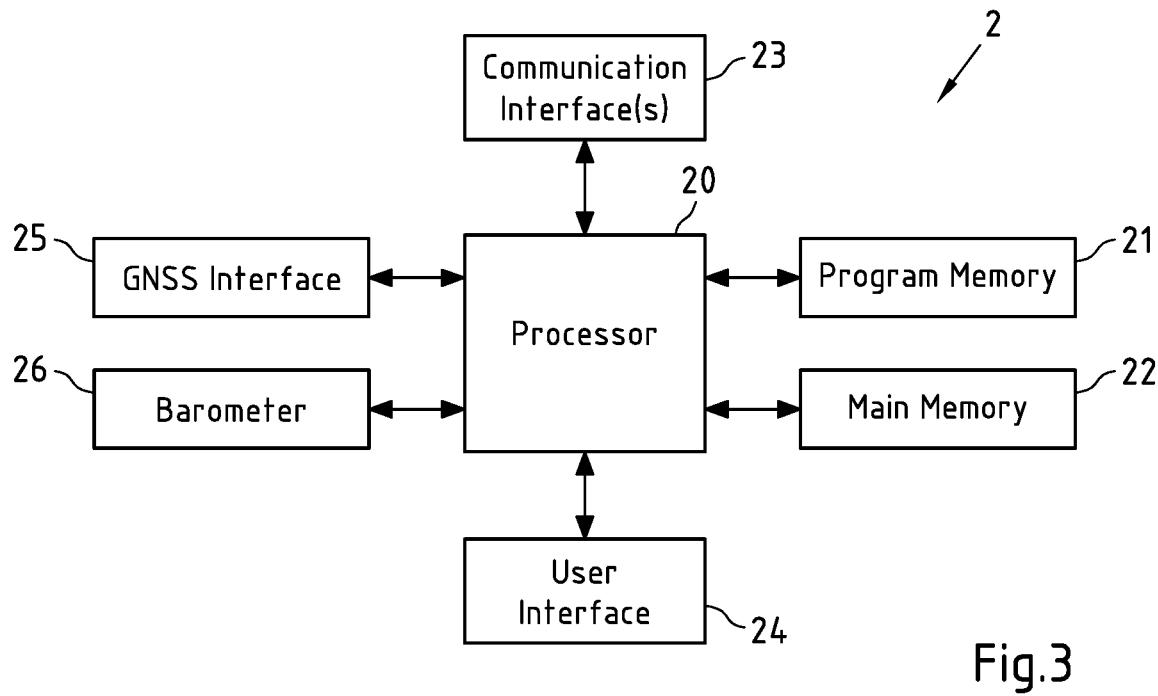
FIG. 3 is a block diagram of the mobile device of FIG. 1.

FIG. 3 is an exemplary block diagram of the mobile device 2 of FIG. 1. For instance, the mobile device 2 is or forms a part (e.g. as a module) of a mobile terminal, a cellular phone, a personal digital assistant, a laptop computer, a tablet computer or a multimedia player. Mobile device 2 comprises a processor 20. Processor 20 may represent a single processor or two or more processors, which are for instance at least partially coupled, for instance via a bus. Processor 20 executes a program code stored in program memory 21 (for instance program code causing mobile device 2 to perform one or more of the embodiments of a method (or parts thereof) according to the second aspect of the invention (as for instance further described below with reference to FIG. 6), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 21 may for instance comprise a first memory portion that is fixedly installed in mobile device 2, and a second memory portion that is removable from apparatus 2, for instance in the form of a removable SD memory card. One or more sets of position information, for instance in a database, that are useable by mobile device 2 to determine positions may for instance be stored in program memory 21. Main memory 22 may for instance be a volatile memory. It may for instance be a RAM or DRAM memory, to give but a few non-limiting examples. It may for instance be used as a working memory for processor 20 when executing an operating system and/or programs.

Processor 20 further controls a communication interface 23 configured to receive and/or output information. For instance, communication interface 23 may be configured to receive signals from beacons 1-1, 1-2, 1-3. For this, the communication interface 23 may at least comprise a BLE component including at least a BLE receiver (RX). It is to be understood that the BLE receiver may also be a part of a BLE transceiver. The BLE component is configured to scan for radio signals that are broadcast by BLE beacons 1-1, 1-2, 1-3, to extract advertising data contained in detected BLE signals. It is to be understood that any computer program code based processing required for receiving and evaluating BLE signals may be stored in an own memory of the BLE component and executed by an own processor of the BLE component, or it may be stored for example in memory 22 and executed for example by processor 20.

Mobile device 2 may further be configured to exchange information with and/or identify beacons 1-1, 1-2, 1-3. Mobile device 2 may further be configured to communicate with server 3 of system 4 (see FIG. 1). This may for instance comprise sending an estimated ambient pressure at mobile device 2 to server 2. The communication may for instance be based on a wireless connection. In addition to the BLE component above, the communication interface 23 may thus comprise further circuitry such as modulators, filters, mixers, switches and/or one or more antennas to allow transmission and/or reception of signals, e.g. for the communication with server 3. In embodiments of the invention, communication interface 23 is inter alia configured to allow communication according to a 2G/3G/4G/5G cellular communication system and/or a non-cellular communication system, such as for instance a WLAN network. Nevertheless, the communication route between mobile terminal 2 and server 3 may equally well at least partially comprise wire-bound portions. For instance, server 3 may be connected to a back-bone of a wireless communication system (associated with mobile terminal 2) via a wire-bound system such as for instance the Internet.

Processor 20 further controls a user interface 24 configured to present information to a user of mobile device 20 and/or to receive information from such a user. User interface 24 may for instance be the standard user interface via which a user of mobile device 2 controls other functionality thereof, such as making phone calls, browsing the Internet, etc.

Processor 20 may further control an optional GNSS interface 25 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case mobile device 2 has a GNSS interface 25, the user of mobile device 2 can still benefit from using positioning technologies based on other sources, such as transmitters of communication systems (such as beacons 1-1, 1-2, 1-3), since these technologies may reduce time-to-first-fix and/or lower power consumption as compared to GNSS-based positioning. Also, and perhaps even more important, positioning technologies based on signals from transmitters of communication systems work indoors, which is generally a challenging environment for GNSS-based technologies.

In certain embodiments, the mobile device 2 may further comprise a barometer 26, similar to barometer 13 of beacon 1, for instance.

The components 21-25 of apparatus 2 may for instance be connected with processor 20 by means of one or more serial and/or parallel busses.

Figure 4:
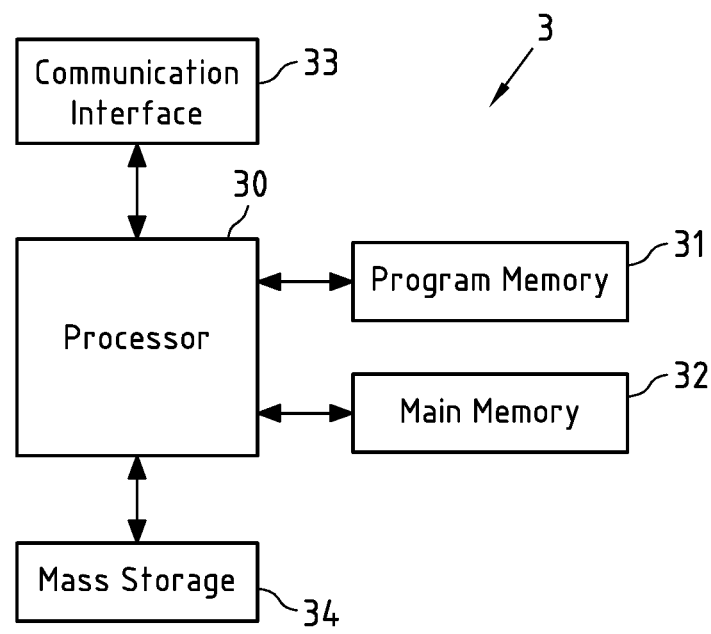
FIG. 4 is a block diagram of server of FIG. 1.

FIG. 4 is an exemplary block diagram of server 3 of FIG. 1. Server 3 comprises a processor 30. Processor 30 may represent a single processor or two or more processors, which are for instance at least partially coupled, for instance via a bus. Processor 30 executes a program code stored in program memory 31 (for instance program code causing server 3 to perform one or more of the embodiments of a method (or parts thereof) according to the second aspect of the invention (as for instance further described below with reference to FIG. 7), when executed on processor 30). Processor 30 further interfaces with a main memory 32 (for instance acting as a working memory) and a mass storage 34, which may for instance collect and store a plurality of estimations of ambient pressures at mobile devices (e.g. mobile device 2), respective estimations of positions of the mobile devices and respective information representative of times of measurement. The information may for instance be stored in a database.

Processor 30 further controls a communication interface 33 configured to receive and/or output information. For instance, server 3 may be configured to communicate with mobile device 2 of system 4, as explained above (see FIG. 1). In case, server 3 is located onsite, that is in particular in the coverage areas of the beacons 1-1, 1-2, 1-3, the communication interface 33 may also be configured to receive signals from beacons 1-1, 1-2, 1-3. For this, the communication interface 33 may comprise a BLE component including at least a BLE receiver or a BLE transceiver, as explained with respect to mobile device 2.

Figure 5:
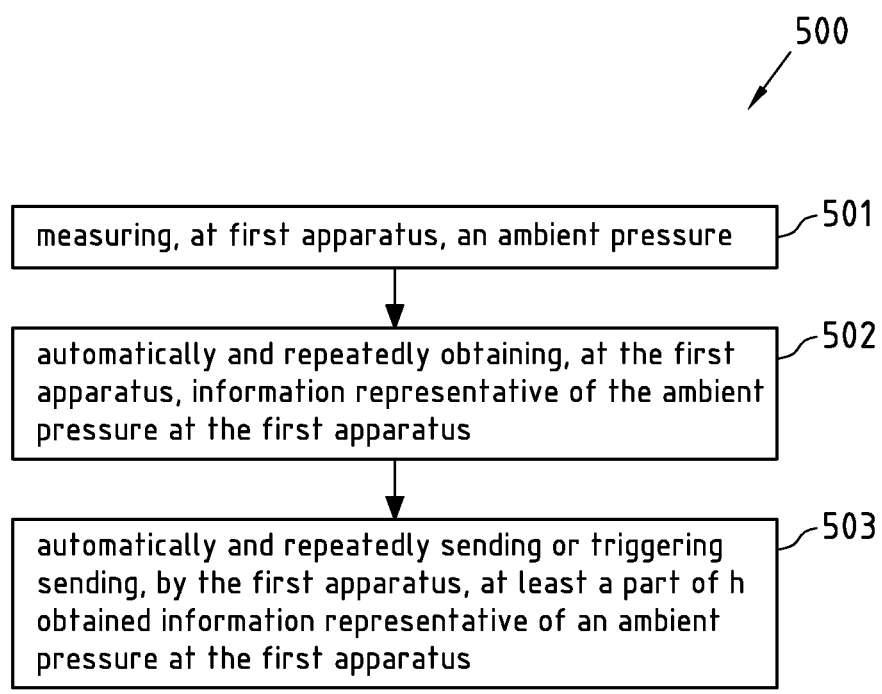
FIG. 5 is a flow chart illustrating an exemplary embodiment of a method according to the first aspect of the invention.

FIG. 5 is a flow chart 500 illustrating an exemplary embodiment of a method according to the first aspect of the invention. The actions of flow chart may be performed by beacon 1 (that is each of the beacons 1-1, 1-2, 1-3), for example.

First, beacon 1 by means of barometer 13 measures an ambient pressure at the beacon 1 in order to obtain information representative of an ambient pressure at the beacon 1 (action 501). This information representative of an ambient pressure may be a pressure value, for instance. The information may be stored in memory 11, for example. The measuring may be repeated automatically. As a result, beacon 1 is able to automatically and repeatedly obtain information representative of an ambient pressure at the beacon 1 (action 502). At least a part of the obtained information representative of an ambient pressure at the beacon 1 is then automatically and repeatedly sent by the beacon 1 (action 503) over a Bluetooth interface of beacon 1. The information is in this case sent in the AdvData field of the payload of an advertising channel PDU of a Bluetooth LE packet. Each of beacons 1-1, 1-2, 1-3 of FIG. 1 may repeat the above actions and may thus continuously sent information representative of an ambient pressure at its respective position.

Figure 6:
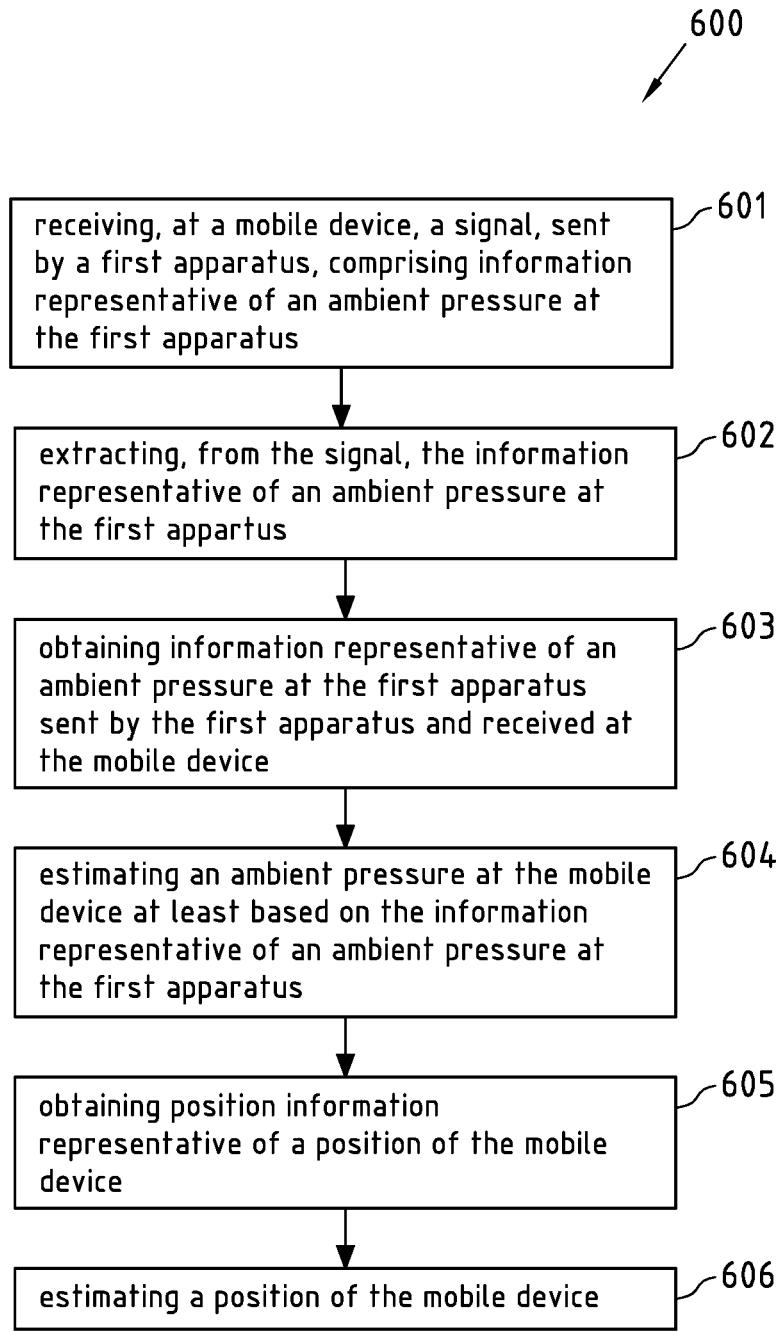
FIG. 6 is a flow chart illustrating an exemplary embodiment of a method according to the second aspect of the invention.

FIG. 6 is a flow chart 600 illustrating an exemplary embodiment of a method according to the second aspect of the invention. The actions of flow chart 600 may be performed by mobile device 2 of FIG. 1, for example. However, the actions of flow chart 600 may in part also be performed by server 3 of FIG. 1, for example.

First, a signal, which comprises the information representative of an ambient pressure at the respective beacon 1 and which is sent by the beacon 1, is received at the mobile device 2 over a Bluetooth interface of mobile device 2 (action 601). The mobile device 2 then extracts, from the signal, the information representative of an ambient pressure at the respective beacon 1 (action 602). This may be repeated for different beacons, for example.

Thus, information representative of an ambient pressure at the beacon 1, which information was sent by the beacon 1 and received at the mobile device 2, can be obtained at the mobile device 2 (action 603). However, this information may also be obtained by server 3, as it may be transmitted from mobile device 2 to server 3.

Based on the information representative of an ambient pressure at the beacon 1, an ambient pressure at the mobile device 2 can be estimated (action 604). If the mobile device has only received a signal from one beacon, the ambient pressure at the bean may be used as the estimation of the ambient pressure at the mobile device. If however, the mobile device 2 has received signals from more than one beacon, the estimation of the ambient pressure at the mobile device 2 may be determined by weighting the information representative of an ambient pressure at the respective beacons. The weighting may be based on the received signal strength (RSS) of the signals of the beacons, as they may be considered as a representative of the distance between the mobile device 2 and the respective beacon. The estimation of the ambient pressure at the mobile device 2 may be performed by the mobile device 2 or by server 3.

Further, position information representative of a position of the mobile device 2 is obtained (action 605). As explained, signals from the GNSS Interface 25 may not be sufficient, in particular indoors, for estimating the position of the mobile device 2. Thus, additionally or as an alternative, it is possible that the mobile terminal 2 determines position information based on other sources. As an example, the mobile terminal 2 may use the signals of the beacons 1-1, 1-2, 1-3 to obtain position information. However, signals of transmitters of other communication systems may also be used for this purpose.

Then, a position of the mobile device 2 is estimated (action 606). As an example, the mobile terminal 2 may already have information about beacons 1-1, 1-2, 1-3. For instance, based on models of the coverage areas and/or radio channel models of the beacons 1-1, 1-2, 1-3, the mobile terminal 2 may be capable of estimating a position of the mobile device. The estimation of the ambient pressure at the mobile device may support the determination of the vertical position of the mobile device, for example. As another example the estimation of the ambient pressure at the mobile device may indicate the indoor/outdoor state the mobile device and thus indicate a preferred method for estimating the position (e.g. based on satellite signals or communication networks signals). However, the estimation of the position of the mobile device may also be performed without the use of the estimated ambient pressure at the mobile device 2. In this case the mobile 2 device can provide an estimated ambient pressure with an associated estimated position of the mobile device 2, e.g. for collecting position specific ambient pressure estimations in dependence. As a further example and in case mobile device comprises a barometer, the estimated ambient pressure may be used to calibrate the barometer of mobile device 2.

Figure 7:
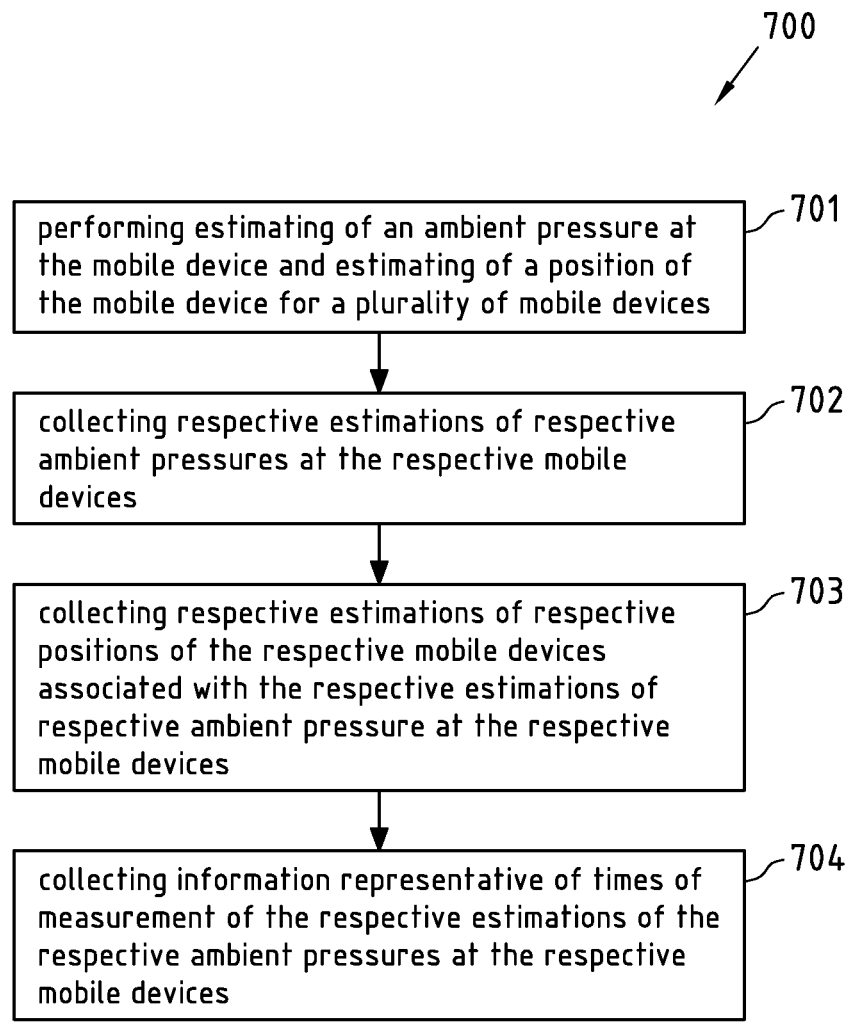
FIG. 7 is a flow chart illustrating a part of an exemplary embodiment of a method according to the second aspect of the invention.

FIG. 7 is a flow chart 700 illustrating a part of an exemplary embodiment of a method according to the second aspect of the invention. The actions of flow chart 700 may be performed by server 3, for example.

According to flow chart 700, the estimating of an ambient pressure at the mobile device 2 and the estimating of a position of the mobile device 2 (i.e. the actions 601 to 606 of flow chart 600) is performed for a plurality of mobile devices (action 701).

Server 3 then collects respective estimations of respective ambient pressures at the respective mobile devices (action 702) and collects respective estimations of respective positions of the respective mobile devices, wherein the estimations of positions are associated with the respective estimations of ambient pressures at the mobile devices (action 703). Thus, server 3 may act as a crowd sourcing server, which collects ambient pressure estimates associated with respective position estimates.

Optionally, server 3 may also collect information representative of times of measurement of the respective estimations of the respective ambient pressures at the respective mobile devices (action 704). This may enable a temporal resolution of the estimated ambient pressures, which may be useful or necessary for certain services, such as weather predictions or the like.

Figure 8:
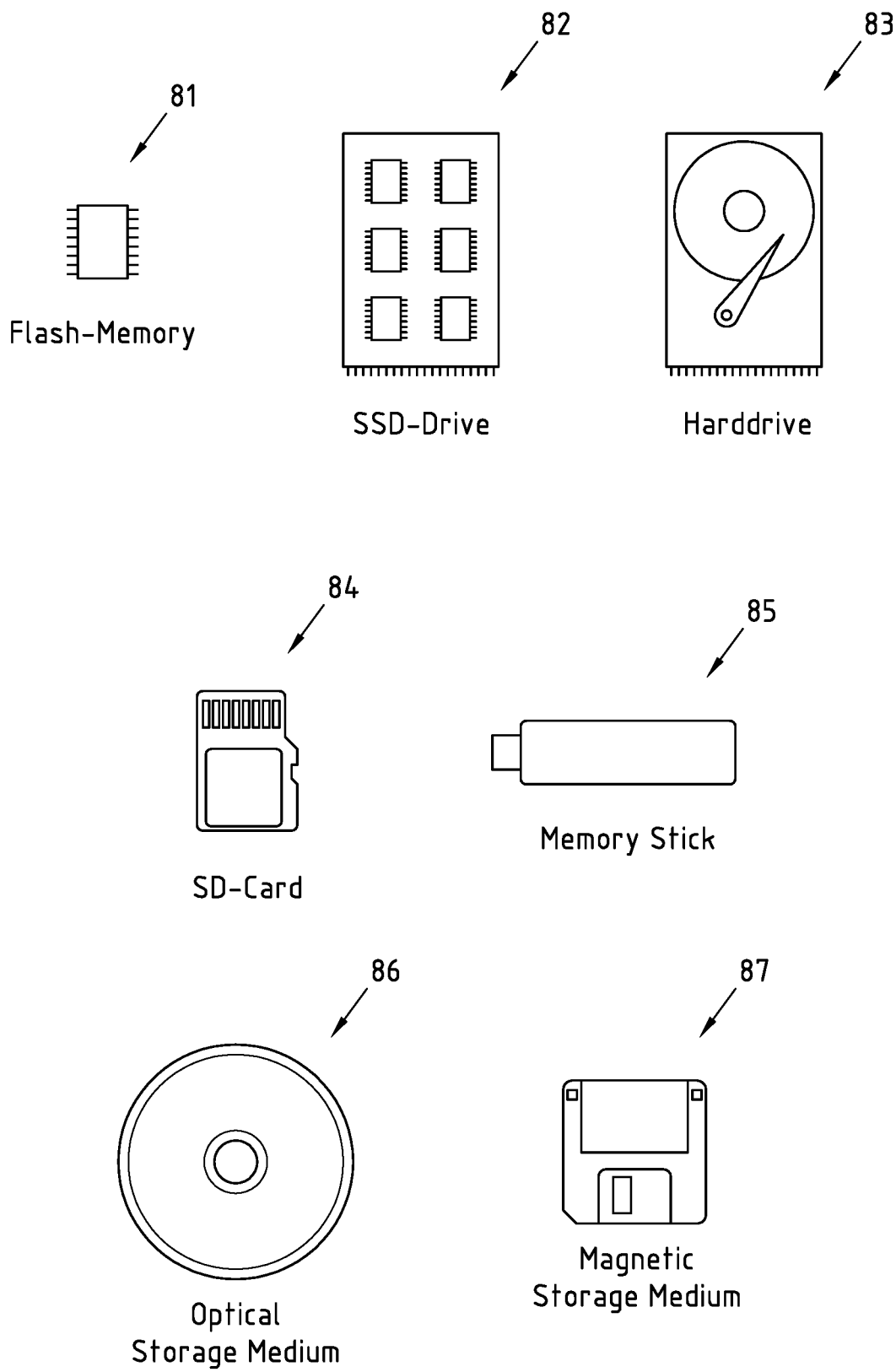
FIG. 8 is a schematic illustration of examples of tangible storage media according to the present invention.

FIG. 8 is a schematic illustration of examples of tangible storage media according to the present invention, that may for instance be used to implement memory 11 of FIG. 2, program memory 21 of FIG. 3 and/or program memory 31 of FIG. 4. To this end, FIG. 8 displays a flash memory 80, which may for instance be soldered or bonded to a printed circuit board, a solid-state drive 81 comprising a plurality of memory chips (e.g., Flash memory chips), a magnetic hard drive 82, a Secure Digital (SD) card 83, a Universal Serial Bus (USB) memory stick 84, an optical storage medium 86 (such as for instance an CD-ROM or DVD) and a magnetic storage medium 87.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 10, 20 and 30 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus configured to determine a three-dimensional position of a mobile device, the apparatus (a) being said mobile device or a server and (b) comprising at least one processor and at least one memory including computer program code, the at least one memory and the computer program code configured to, with the at least one processor, cause the apparatus to at least:
receive information representative of an ambient pressure at a location of a beacon, wherein the beacon broadcasts said information representative of the ambient pressure at the location of the beacon within a broadcast area;
estimate an ambient pressure at a location of said mobile device, wherein said mobile device is located within the broadcast area of the beacon, and the ambient pressure at said mobile device is estimated based at least in part on said information representative of the ambient pressure at the location of the beacon;
obtain position information for said mobile device;
based at least in part on the estimated ambient pressure at the location of said mobile device and the position information for said mobile device, estimate a three-dimensional position of said mobile device, wherein said three-dimensional position comprises a vertical position, the vertical position comprising an indication of a floor level upon which said mobile device is located; and
use the three-dimensional position of said mobile device to perform a positioning-related or navigation-related function based at least in part on the vertical position.

2. The apparatus according to claim 1, wherein information representative of ambient pressure at respective locations of at least two beacons is received and the at least one memory and the computer program code are further configured to, with the at least one processor, cause the apparatus to estimate the ambient pressure at the location of said mobile device by weighting said information representative of respective ambient pressures at the respective beacons, wherein the weighting is performed based on a relative distance between said mobile device and each of the at least two beacons.

3. The apparatus according to claim 1, wherein said mobile device is or comprises at least one of:
 a Bluetooth receiver;
 a Bluetooth receiver enabling Bluetooth low energy mode; or
 a Bluetooth low energy receiver.

4. The apparatus according to claim 1, wherein the beacon broadcasts the information representative of the ambient pressure at the location of the beacon via a broadcast comprising at least one of:
 advertising data;
 advertising data in at least one air interface packet;
 at least one advertising channel; or
 at least one advertising channel that is provided for broadcasts.

5. The apparatus according to claim 1, wherein the at least one memory and the computer program code are further configured to, with the at least one processor, cause the apparatus to:
 determine at least one of a state of said mobile device or a change of a state of said mobile device based at least in part on said estimated ambient pressure at the location of said mobile device.

6. The apparatus according to claim 5, wherein said state is or relates to at least one of:
 a vertical position of said mobile device; or
 an indoor/outdoor state of said mobile device.

7. The apparatus according to claim 6, wherein the at least one memory and the computer program code are further configured to, with the at least one processor, cause the apparatus to determine a vertical position of the three-dimensional position of said mobile device based at least in part on the estimation of the ambient pressure at the location of said mobile device.

8. The apparatus according to claim 7, wherein said obtained position information is based at least in part on or comprises at least one of:
 a received signal strength of a broadcast comprising the information representative of the ambient pressure at the location of the beacon;
 a timing measurement of the broadcast comprising the information representative of the ambient pressure at the location of the beacon;
 an angle of arrival of the broadcast comprising the information representative of the ambient pressure at the location of the beacon;
 a magnetic field strength and/or direction of the broadcast comprising the information representative of the ambient pressure at the location of the beacon; or
 an identification of a transmitter that transmitted the broadcast comprising the information representative of the ambient pressure at the location of the beacon.

9. The apparatus according to claim 8, wherein the at least one memory and the computer program code are further configured to, with the at least one processor, cause the apparatus to:
 perform said estimating of an ambient pressure at said mobile device and said estimating of a position of said mobile device for a plurality of devices, the plurality of devices comprising the mobile device;
 collecting respective estimations of respective ambient pressures at said respective devices; and
 collecting respective estimations of respective positions of said respective devices associated with said respective estimations of respective ambient pressures at said respective devices.

10. The apparatus according to claim 9, wherein the at least one memory and the computer program code are further configured to, with the at least one processor, cause the apparatus to:
 determine information representative of a floor height of a building at least based on respective estimations of respective ambient pressures at said respective devices.

11. The apparatus according to claim 9, wherein the at least one memory and the computer program code are further configured to, with the at least one processor, cause the apparatus to
 collect information representative of times of measurement of said respective estimations of said respective ambient pressures at said respective devices.

12. The apparatus according to claim 11, wherein the at least one memory and the computer program code are further configured to, with the at least one processor, cause the apparatus to
 determine information related to a weather prediction at least based on one or more of:
 said collected estimations of respective ambient pressures at said respective devices;
 said collected estimations of respective positions of said respective devices; or
 said collected information representative of respective times of measurement of said respective estimations of respective ambient pressures at said respective devices.

13. The apparatus according to claim 7, wherein said obtained position information is derived from at least one of:
 a Global Navigation Satellite System (GNSS);
 a Wireless Local Area Network (WLAN) system;
 a Bluetooth (BT) system;
 a Radio Frequency Identification (RFID) system;
 a cellular network system;
 one or more sensors; or
 a manual input.

14. The apparatus according to claim 6, the at least one memory and the computer program code are further configured to, with the at least one processor, cause the apparatus to determine a source from which to obtain the position information based on the determined indoor/outdoor state, wherein the position information is obtained from the determined source.

15. The apparatus according to claim 1, wherein the indication of the floor level upon which said mobile device is located comprises a floor level name or a representation of the floor level name that corresponds to the floor level upon which said mobile device is located and that is determined based at least in part on floor heights for a building corresponding to the position information, the floor heights for the building derived from a plurality of ambient pressure estimates for a plurality of locations within the building.

16. The apparatus according to claim 1, wherein the beacon is configured to automatically and repeatedly obtain information representative of an ambient pressure at the location of the beacon; and automatically and repeatedly broadcast or trigger broadcasting of at least a part of said obtained information representative of the ambient pressure at the location of the beacon.

17. The apparatus according to claim 16, wherein the beacon is at least a part of or comprises at least one of
   a Bluetooth beacon;
   a Bluetooth beacon enabling Bluetooth low energy mode; or
   a Bluetooth low energy beacon.

18. The apparatus according to claim 1, wherein information representative of the ambient pressure at the location of the beacon is broadcasted by the beacon in a common data packet or in separate data packets with respect to further information broadcasted by the beacon.

19. A method for determining a three-dimensional position of a mobile device, the method performed by said mobile device or a server, the method comprising:
   receiving, by said mobile device or server, information representative of an ambient pressure at respective locations of one or more beacons, wherein a beacon of the one or more beacons broadcasts the information representative of the ambient pressure at a location of the beacon, wherein said mobile device or server comprises at least one processor and at least one memory;
   estimating, by said mobile device or server, an ambient pressure at a location of a mobile device located within a broadcast area of the beacon, the ambient pressure at said mobile device estimated based at least in part on said information representative of the ambient pressure at the location of the beacon;
   obtaining, by said mobile device or server, position information for said mobile device;
   based at least in part on the estimated ambient pressure at the location of said mobile device and the position information for said mobile device, estimating, by said mobile device or server, a three-dimensional position of said mobile device, wherein said three-dimensional position includes a vertical position, the vertical position comprising an indication of a floor level upon which said mobile device is located; and
   using, by said mobile device or server, the three-dimensional position of said mobile device to perform a navigation-related function based at least in part on the vertical position.

20. The method of claim 19, wherein information representative of ambient pressure at respective locations of at least two beacons is received and the ambient pressure at the location of said mobile device is estimated by weighting said information representative of respective ambient pressures at the respective beacons, wherein the weighting is performed based on a relative distance between said mobile device and each of the at least two beacons.

* * * * *